United States Patent [19]
Starkey

[11] 3,961,686
[45] June 8, 1976

[54] EASY-UP TREE STAND

[76] Inventor: Isaac R. Starkey, 205 W. Sugar Tree St. Wilmington, Ohio 45177

[22] Filed: Apr. 18, 1973

[21] Appl. No.: 352,172

[52] U.S. Cl. .............................. 182/187; 182/196
[51] Int. Cl. ........................ A47c 9/10; E06c 1/56
[58] Field of Search ............ 182/187, 196, 197, 198

[56] References Cited
UNITED STATES PATENTS

| | | | |
|---|---|---|---|
| 143,112 | 9/1873 | Ainsworth | 182/206 |
| 3,116,808 | 1/1964 | Riley | 182/187 |
| 3,460,649 | 8/1969 | Baker | 182/187 |

*Primary Examiner*—Reinaldo P. Machado

[57] ABSTRACT

A perch accessory intended for use by a hunter in order that he may comfortably sit in a tree while watching for passing game in order to shoot the same; the accessory consisting of a seat unit removably securable high on a side of a tree trunk, and a ladder unit removably securable to a lower part of the trunk and which allows the hunter to climb up to the seat.

1 Claim, 3 Drawing Figures

EASY-UP TREE STAND

This invention relates particularly to equipment for use by hunters.

In the sport of hunting, it is well known that sometimes hunters prefer to get off a wet ground and perch themselves within a tree when looking for game; however, often a tree cannot be easily climbed and it may not have a suitable place when a hunter can comfortably place himself. This situation is accordingly in want of an improvement for the hunters.

Therefore, it is a principal object of the present invention to provide an easy-up tree stand that is readily securable to a tree so to allow the hunter to easily climb up to a platform from which he can look out for game, and where the hunter is dry from a wet ground.

Yet another object is to provide an easy-up tree stand that is readily foldable so it can be conveniently transported by a hunter into a hunting area and where it can then be installed on a tree trunk.

Still another object is to provide an easy-up tree stand that will not injure any tree to which it is secured.

Other objects are to provide an easy-up tree stand that is simple in design, inexpensive to manufacture, rugged in construction, easy to use, and efficient in operation.

These and other objects will be readily evident upon a study of the following specification and the accompanying drawing, wherein.

Figures 1, 2, 3:
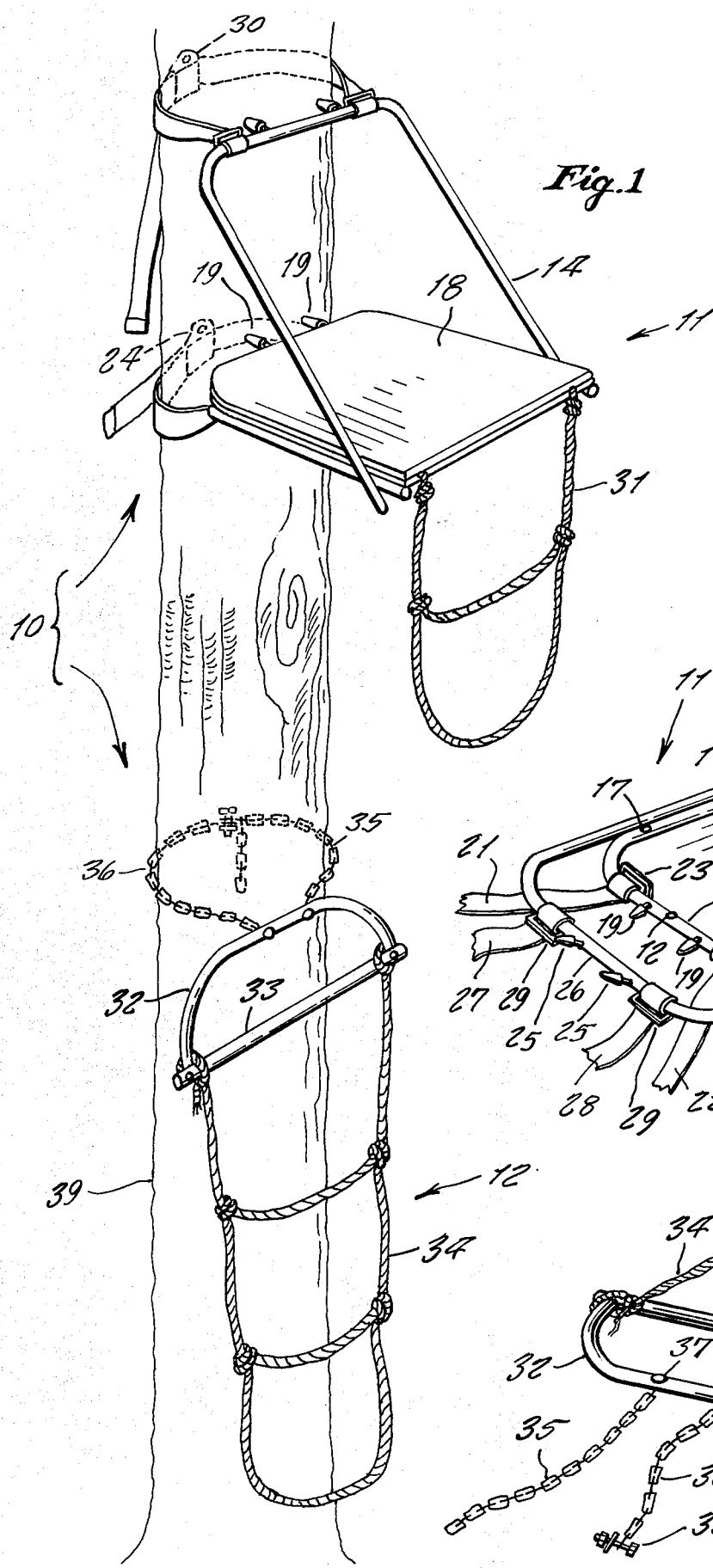
FIG. 1 is a perspective view of the invention shown installed on a tree.
FIG. 2 is a bottom perspective view of a chair unit of the invention shown upside down and in a collapsed position, ready for transportation or storage.
FIG. 3 is a fragmentary perspective view of a ladder unit of the invention.

Reference is now made to the drawing in detail, wherein the reference numeral 10 represents an Easy-Up Tree Stand according to the present invention wherein there is a seat unit 11 for attachment higher up around a tree trunk and a ladder unit 12 attachable around a lower part of the tree trunk, and which provides access means for a hunter to reach the seat unit.

The seat unit 11 includes U-shaped tubular light weight metal frames 13 and 14, one frame 13 being fitted inside the other and the ends of the legs thereof being attached pivotally together by means of pins 15 so that they can be pivoted between the positions shown in FIGS. 1 and 2. A plywood panel 16 is secured by screws or rivets 17 to an upper side of frame 13 so to form a seat. A foam rubber pad or cushion 18 suitably enclosed in a waterproof plastic cover is secured on an upper side of the panel 16.

A pair of spaced apart, tapered spurs 19 are rigidly secured to an intermediate transverse leg 20 of the frame 13, and extend straight outward from the frame in a same flat plane as the frame. Straps 21 and 22 are each secured at their one ends around the leg 20 and are positioned adjacent the outer side of each of the spurs. Each of these strap ends has a buckle 23 secured thereto and through which the straps are adjustably securable together by a buckle 24 of the type used on safety belts of automobiles to secure passengers to a seat.

The outer frame 14 has a pair of spaced apart, tapered spurs 25 rigidly secured to an intermediate leg 26 thereof, the spurs extending from the frame at an angle respective to the flat plane of the frame. A pair of straps 27 and 28 fitted with buckles 29 at their one ends are looped at these ends around the leg 26 adjacent the outer sides of the spurs, and the opposite ends of the straps are adjustably attachable together by a buckle 30 of a same type as buckle 24.

A two-step ladder 31 made preferably of nylon rope is attached to a front end of the panel.

The ladder unit 12 includes a bowed, tubular, light weight metal frame 32, the opposite ends of which are firmly secured to the opposite ends of a straight metal bar 33 of similar material extending therebetween. A three-step ladder 34 made likewise of nylon rope is attached at the junctioning ends of the bowed frame and the straight bar. A pair of metal chains 35 and 36 are secured at their one ends to a pair of spaced apart rivets 37 along a center portion of the frame, the opposite ends of the chains being adjustably attachable together by employment of an interfitting bolt, washer and nut as shown at 38, or else by any conventional snap hook.

In operative use, the units 11 and 12 are secured to a tree trunk 39 by passing the straps and chains therearound as shown in FIG. 1. It will be noted that the spurs 19 and 25 extend horizontally directly against the side of the tree trunk and a circumferential arcuate portion thereof fits between each set of spurs. Accordingly the spurs stabilize the unit from sideward rocking. To ascend, a hunter climbs up the unit 12, then reaches unit 11, and climbs it to the seat.

I claim:

1. In an easy-up tree stand, the combination of a seat unit attached to a higher part of a tree trunk, and a ladder unit attached therebelow to a lower part of said tree trunk, said seat unit comprising a pair of U-shaped frames attached pivotally together, one frame having a seat panel attached thereupon and a cushion or pad attached on said panel, a depending rope ladder attached to said panel, spurs attached to each frame, and straps attached along an intermediate leg of said U-shaped frame and securable around said tree trunk, each said U-shaped frame having a pair of said spurs in spaced apart relation along said intermediate leg of said U-shaped frame, said spurs being tapered, said ladder unit comprising a bowed frame and a straight rod rigidly attached together at their ends, a rope ladder attached thereto, and a pair of chains attached to said bowed frame, the other ends of said chains being adjustably attached together by a bolt, nut and washer assembly.

* * * * *